Feb. 14, 1950 L. ELLER 2,497,400
CUTTING TOOL
Filed July 31, 1946 3 Sheets-Sheet 1
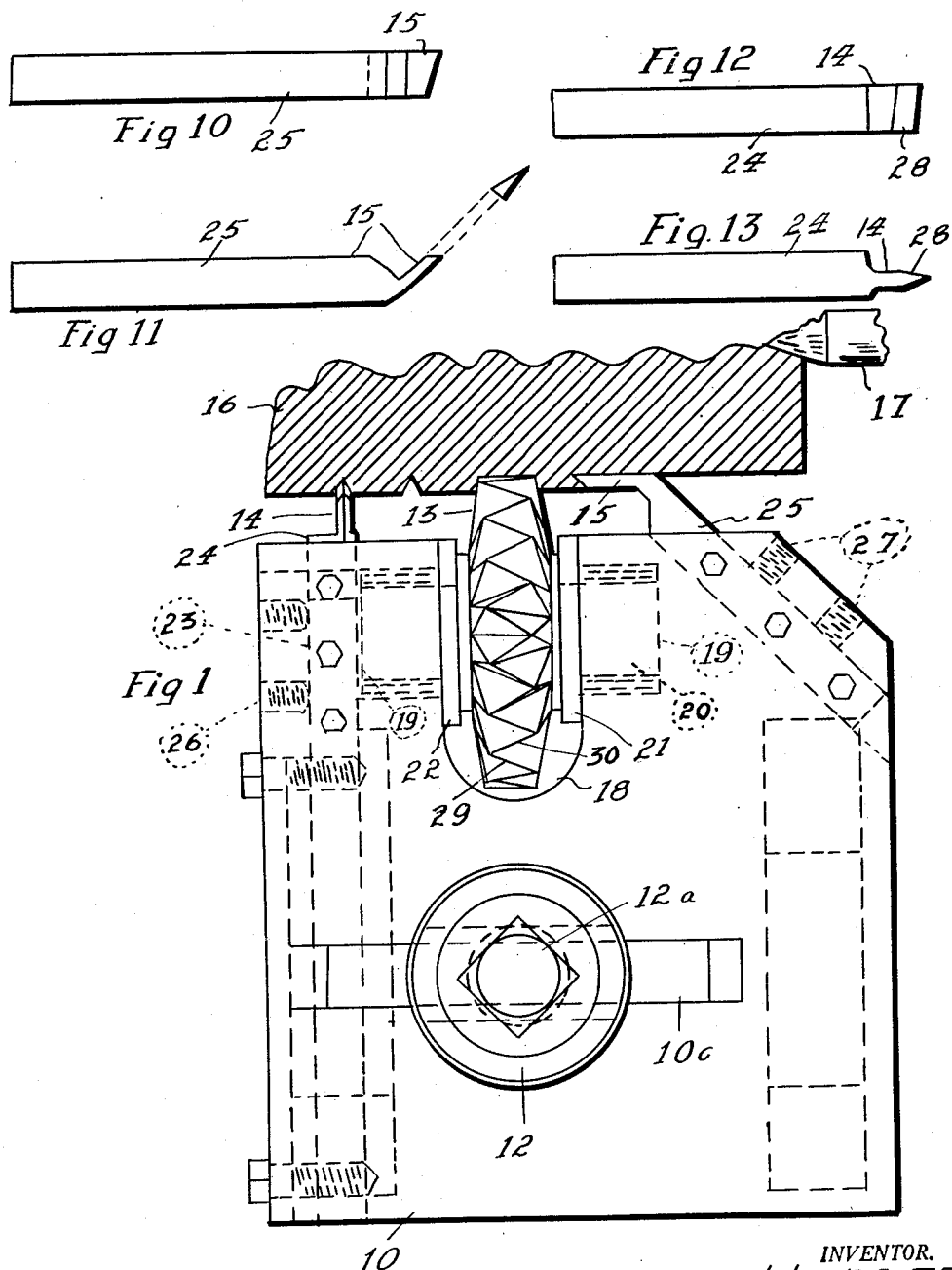
INVENTOR.
LEE ELLER
BY
Smith & Wells

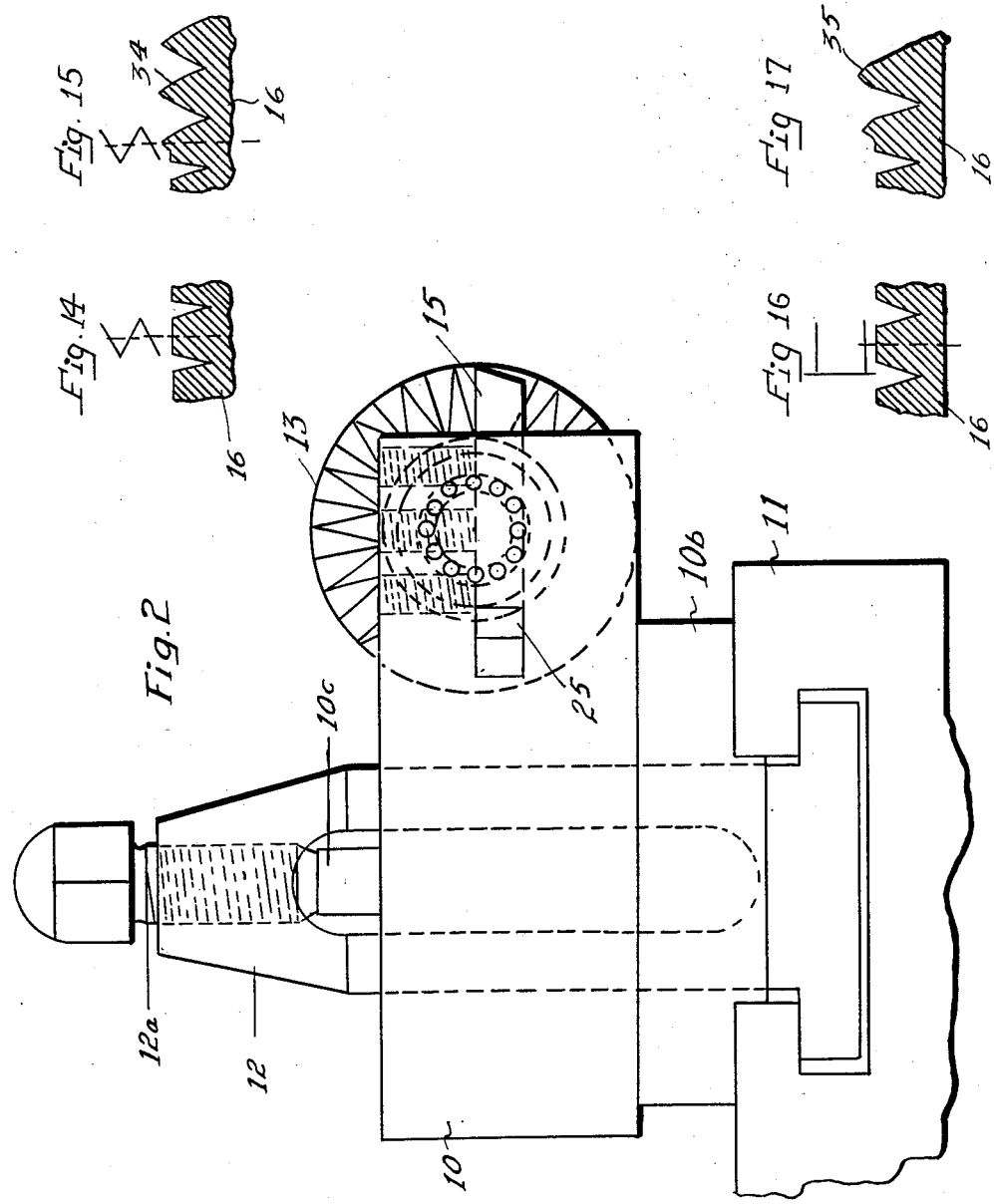

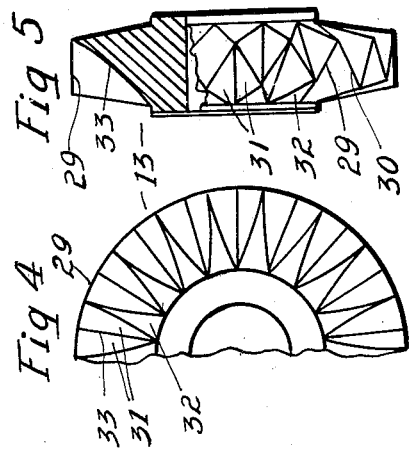
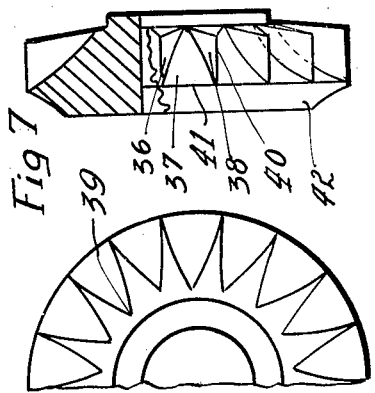
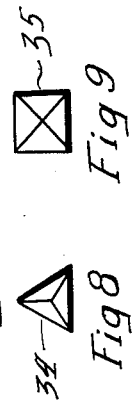
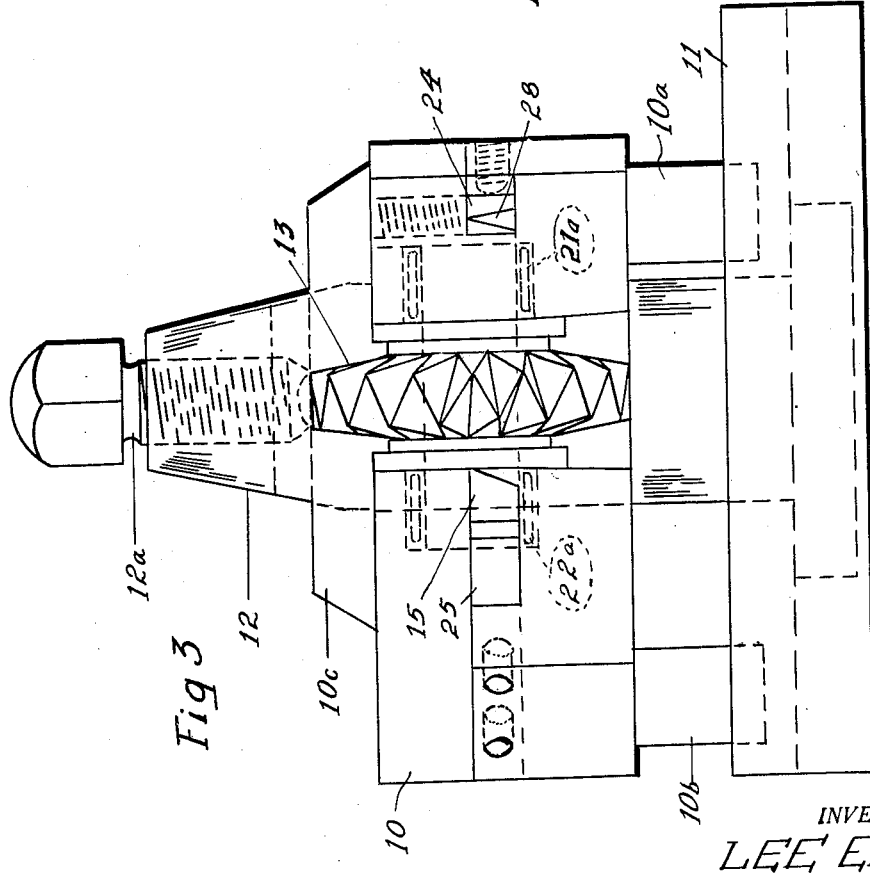

Patented Feb. 14, 1950

2,497,400

UNITED STATES PATENT OFFICE 2,497,400

CUTTING TOOL

Lee Eller, Spokane, Wash., assignor to A. E. Rains, Spokane, Wash.

Application July 31, 1946, Serial No. 687,395

4 Claims. (Cl. 29—105)

This invention relates to cutting tools and more particularly to a cutting tool that is adapted to cut relatively soft metals and metal alloys into small particles having a plurality of faces which are angularly disposed with respect to each other. It is well known to form a packing mass for various types of bearings by utilizing metallic particles in combination with particles of other materials such as wood, rubber, synthetic rubber, asphalt composition and the like. These particles are made up in a variety of sizes and are mingled together in certain proportions to form a packing mass which may or may not be enclosed in a suitable fabric container for convenience in handling. The characteristics of such a packing mass are that it lends itself to oil impregnation and it has a capacity of yielding or rearranging the particles therein to provide a packing mass for stuffing boxes and the like wherein the shaft is engaged by relatively smooth surfaces and the mass itself is yielding as well as capable of retaining a substantial quantity of lubricant for a long period of time. As an example of such a packing I refer to the Pollard Patent 2,363,688.

It has long been a problem in the manufacture of such a packing as that described above to provide means for forming the metallic particles into the desired shape in a way that is sufficiently cheap to keep the cost of a packing at an economical level. The metallic particles utilized are relatively soft when compared with the shaft about which the stuffing box or packing gland is formed. Suitable materials for the metallic particles are lead alloys, pure lead, copper, and copper alloys. It is necessary to cut a variety of sizes of particles and the shapes of the particles must be such that there are several faces on each particle which faces preferably are not parallel to each other. Pyramidal particles have the proper characteristics since they may be made with a base and several faces none of which will be parallel to the others. A triangular pyramid or a quadrangular pyramid will have the proper characteristics for the packing. It is not necessary that the flattened surfaces be true planes so that variations which will naturally occur in the forming of the soft metals and cutting thereof are not particularly objectionable. Small burrs left by cutting are not objectionable since they flatten readily when the packing is put in place.

It is the principal purpose of my invention to provide a cutting device wherein a billet of the metal may be cut up into particles by supporting the billet in contact with a plurality of cutting and forming tools and effected movement between the tools and billet to first shape the surface of the billet into a series of pyramids and then shave the pyramids from the billet to produce the particles rapidly.

It is also a purpose of my invention to provide a cutting device of the character above described which is readily applicable to a lathe in which the billet may be rotated.

The novel features that I consider characteristic of my invention are set forth with particularity in the claims. The invention itself, however, both as to its organization and its method of operation, together with additional objects and advantages thereof will be understood from the description of a specific embodiment when read in connection with the accompanying drawings, in which:

Figure 1 is a plan view of the cutting device showing it as applied to the cutting of a billet that is being rotated by a lathe;

Figure 2 is a view in side elevation of the cutting device;

Figure 3 is a view in side elevation of a cutting device, this view being taken at right angles to Figure 2;

Figures 4 and 5 are fragmentary side and edge views of one form of rotary cutting tool used in the cutting device;

Figures 6 and 7 are views like 4 and 5 of a different form of rotary cutting tool used in the cutting device;

Figure 8 is a plan view of a metallic particle such as is cut from the billet, this figure being a triangular pyramid;

Figure 9 is a view like Figure 8 but showing a four sided pyramid which is produced by using a different form of rotary cutting tool than that used for producing the particles shown in Figure 8;

Figure 10 is a view in side elevation of the parting tool;

Figure 11 is a plan view of the parting tool;

Figure 12 is a view in side elevation of the grooving tool;

Figure 13 is a plan view of the grooving tool;

Figures 14 and 15 are fragmentary sectional views of a portion of the billet showing how the cutting tools deform the surface of the billet to produce a triangular pyramid particle; and Figures 16 and 17 are views like Figures 14 and 15 and show the billet deformation for a quadrangular pyramid particle.

Referring now to the drawings, the cutting device comprises a block 10 which is adapted to be mounted upon the feed carriage 11 of a lathe and clamped by a post 12. Side bars 10a and 10b rest in the carriage and a bar 10c set in grooves in the block 10 extends through the slotted post 12 and is engaged by a screw 12a to lock the block 10 to the carriage. The details of the lathe construction form no part of my invention and are only shown to illustrate the position of the cutting device with respect to the work on which it operates. The block serves as a mounting for a rotating cutting wheel 13, a grooving tool 14 and a parting tool 15. The billet 16 of the material to be cut is mounted to rotate in the lathe as indicated by the support 17 in Figure 1 of the drawing.

The block 10 has a channel 18 formed therein and is bored as indicated at 19 to receive two roller bearing units 21 and 22 for mounting a shaft 20 to support the cutting wheel 13. The block 10 is also slotted at 23 to receive the shank 24 of the grooving tool 14 and is likewise slotted to receive the shank 25 of the cutting tool 15. Set screws 26 secure the tool 14 in place and set screws 27 secure the tool 15 in place in the block.

Tool 14, as shown by Figures 12 and 13, has a V-shaped cutting edge 28 which is tapered downwardly as indicated in Figure 12. The function of this tool is to form a spiral groove in the billet, the space between successive convolutions of the groove being established by the rate of feed of the block 10 in response to rotation of the lathe mechanism.

The rotary cutter 13 may take different forms depending upon the type of particle there is to be produced. For example, the cutter wheel shown in Figures 4 and 5 is designed to cut triangular pyramids while the tool shown in Figures 6 and 7 is designed to cut rectangular pyramids. Inasmuch as the tool 13 must withstand considerable pressure in order to force it into the material of the billet 16, the bearings for this tool are of the roller type consisting of a series of needle roller bearings 21a and 22a. In the cutting tool illustrated in Figures 4 and 5 the peripheral edges of the tool indicated by the numerals 29 and 30 are set at 30 degrees with respect to each other and the tool is cut out to provide converging faces 31 that meet on a curved line 33. The faces 31 alternate from side to side of the tool. The faces 32 opposite the line 33 are tapered to enter the groove formed by the tool 14. In operation the grooving tool forms the groove in the billet at intervals equal to the width, axially of the tool 13, of the edges 29 and 30. This distance is, as shown in the drawings, approximately $\frac{1}{16}$ of an inch. The depth to which the cutter wheel cuts into the billet is approximately ¼ of an inch. The effect is to form the surface of the billet between the grooves formed by the grooving tool into a series of pyramids 34 such as that illustrated in Figure 8 of the drawings. These pyramids have three triangular faces angularly disposed with respect to each other and facing outward from the billet.

The next step in the cutting operation is to shave the formed pyramids from the billet and this is accomplished by the parting tool 15 which is shown in elevation in Figure 10 and in plan in Figure 11. The parting tool 15 is set to cut into the billet 16 a depth substantially equal to that at which the faces 29 and 30 of the tool 13 extend.

The cuttings wheel shown in Figures 6 and 7 functions in the same manner as that shown in Figures 4 and 5 but in this form the cutting tool has three faces, 36, 37 and 38 all of which meet at a point 39. The periphery of the wheel is composed of a plurality of cutting edges 40 which extend axially of the wheel and a circumferential cutting edge 41. The surface of the wheel at the side of the cutting edge 41 opposite the cutting edges 40 is curved as indicated at 42 so as to spread the material. The axial extent of the surface 42 is approximately $\frac{1}{32}$ of an inch when the cutting edges 40 are approximately $\frac{1}{16}$ inch long.

Figures 14 and 15 illustrate the manner in which the stock of the billet is deformed by the tools when a triangular pyramid is being made. It will be noted that the center line of the cutting tool 13 shown in Figures 4 and 5 is midway between the grooves formed by the grooving tool 14. In Figures 15 and 16 the manner in which the cutting tools shown in Figures 6 and 7 deforms the material of the billet is illustrated. It will be noted that in this case the center line of the cutting edges 40 is on the center line between adjacent grooves formed by the grooving tool and that the edge 41 rides in the groove formed by the tool 14. While the particles formed by this cutting device are not plane faced they do have smooth faces which are very close to a plane and these faces are all directed at acute angles to each other. This type of particle is found to be particularly effective in the packing because of the number of faces and the lack of any parallel faces on the particle. Because of the nature of the cutting tool, billets of the material from which the particles are made can be cut down with very little waste and the particles are formed at an extremely rapid rate. The dimensions which have been given herein are of course only by way of examples and are correct for particles which are approximately ⅜ inch wide and ⅜ inch high. For particles of smaller sizes the cutting wheel 13 will of course be made smaller in width and in the length of the faces such as 29, 30 and 40.

It is believed that the nature and advantages of my invention will be apparent from the foregoing description. It is also believed to be evident that various minor modifications may be made in the cutting device without departing from the scope of the invention as defined in the claims.

Having thus described my invention, I claim:

1. Cutting means for cutting multi-faced particles from a billet of relatively soft metal and the like, said cutting means comprising a supporting head having means whereby it may be mounted on the traveling tool support of a lathe in which the billet is mounted for rotation, a rotary cutter having a peripheral portion formed with a multiplicity of outwardly facing cutting edges angularly disposed with respect to each other and tapered faces receding inwardly from said cutting edges and meeting along lines angularly directed with respect to a plane perpendicular to the axis of rotation of the cutter, bearing means in said head rotatably mounting the cutter.

2. A method of cutting a billet of soft metal and the like into similar roughly pyramid-shaped particles which comprises spirally grooving the periphery of the billet to a depth approximately equal to the height of the particles desired with the axial distance between grooves approximately equal to the base width of a particle, pressing transversely extending tapered channels in the billet material between grooves, and shaving the grooved and channelled portion from the billet.

3. A method of cutting a billet of soft metal and the like into similar roughly pyramid-shaped particles which comprises spirally grooving the periphery of the billet to a depth approximately equal to the height of the particles desired with the axial distance between grooves approximately equal to the base width of a particle, pressing transversely extending tapered channels in the billet material between grooves, and thereby forming the surface of the billet into a multiplicity of pointed projections with angularly disposed side faces, and shaving the grooved and channelled portion from the billet.

4. A device for forming a body of soft metal and the like into small multi-faced particles comprising a rotary cutter having a peripheral portion formed with a multiplicity of outwardly facing wedge shaped cutting portions angularly disposed with respect to each other, certain of said portions extending peripherally of the cutter as an unbroken rib, and the other portions extending at right angles to said rib, and a supporting head having bearings mounting the cutter for rotation.

LEE ELLER.

REFERENCES CITED

The following references are of record in the file of this patent:

UNITED STATES PATENTS

| Number | Name | Date |
| --- | --- | --- |
| 112,668 | Acheson | Mar. 14, 1871 |
| 1,112,020 | Merrick | Sept. 29, 1914 |
| 2,362,779 | Stevens | Nov. 14, 1944 |